May 1, 1962  C. E. HORTON ET AL  3,032,232
COMPOSITE CONTAINER
Filed March 2, 1960

INVENTORS
CHARLES E. HORTON,
AMOS L. LEWIS

BY *Amos L. Lewis*

AGENT 3,032,232
COMPOSITE CONTAINER
Charles E. Horton, 505 Brackenridge Ave., Norfolk, Va., and Amos L. Lewis, 428 Glyndon St. NE., Vienna, Va.
Filed Mar. 2, 1960, Ser. No. 12,316
3 Claims. (Cl. 220—23)

This invention relates to a novel container for separating solids from liquids and for storing them.

More particularly this invention relates to a container for separating solids from a liquid and for providing convenient access to either the solids or the liquid.

For various operations it is common practice to provide a composite container or canister to separate solids from a liquid. For instance in the kitchen one may pour the residue from a frying pan into a container preferably having some straining means to separate the solids from the liquid grease which may be kept in storage for future use. A lid sealing both the liquid and solids is provided. Since the grease and solids are usually hot it is common practice to permit a period of draining and cooling before further use. However sometimes it is necessary to obtain some of the grease before the solids container above the liquid has cooled sufficiently to handle. Furthermore, in the conventional canister no handle or provision for conveniently removing the solids container is provided.

An object of this invention is to provide a canister having a solids compartment provided with a separate handle registering with the handle of the canister lid whereby the user has the option of readily removing, the canister lid only, the canister lid and then the solids compartment or the canister lid and the solids compartment as a unit using one hand only.

A further object is to provide such a device wherein no locking or unlocking mechanism is required.

A still further object is to provide such a device that may be operated without danger of soiling or burning the fingers.

Figure 1:
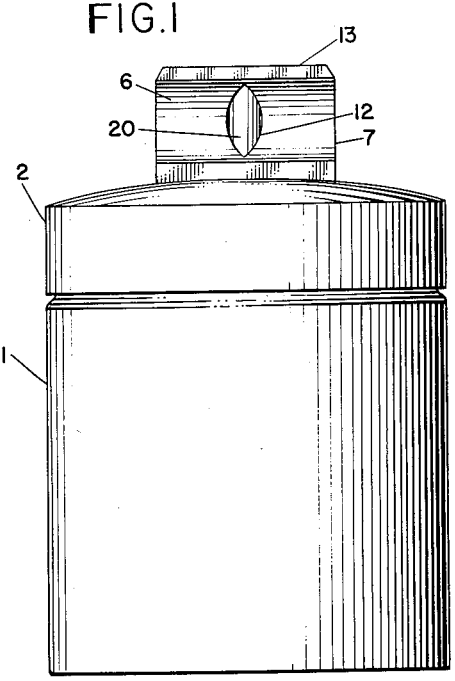
Figure 2:
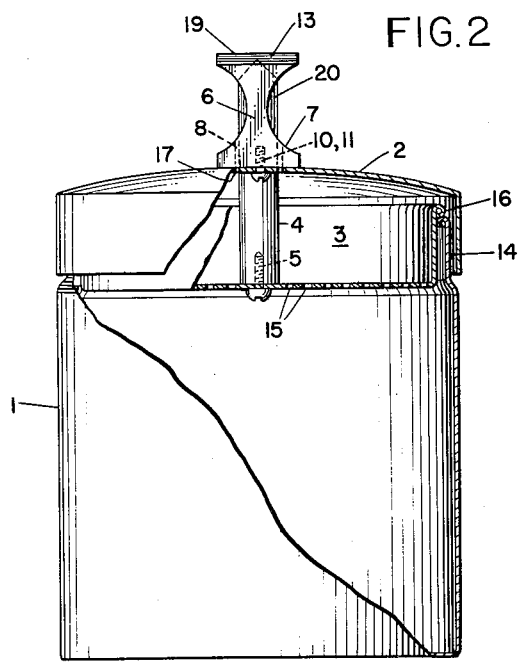

Additional objects and advantages will become apparent as the description proceeds in connection with the accompanying drawings in which:

FIGURE 1 is a front view of the device; and
FIGURE 2 is a side view in partial vertical section.

Referring now more particularly to the drawings the canister 1, which is adapted to receive either a hot or a cold liquid and which may be provided with a handle, has a slightly reduced mouth portion 14.

Solids container 3 has a perforated bottom 15 and fits loosely into the neck portion 14 of cannister 1 with its outwardly turned or beaded upper end 16 resting upon the mouth 14 of canister 1.

Canister cover 2 with handle 6 is adapted to fit loosely over neck 14 of canister 1 and thus form a closure for both it and solids container 3.

Handle 6 is secured to canister cover 2 by any well known means such as screws 10 and 11. The base of handle 6 is shaped to conform with the upper surface of canister cover 2. Its center portion has a hole or cavity 8 extending downward from a point near its top surface 19 entirely through the base portion where it registers with a hole 17 of similar size in the top center of cover 2. Handle 6 has on each side about midway of its height a deeply grooved or fluted portion 7 which extends into vertical hole 8 forming an opening 12 on each side of handle 6.

Solids container 3 is provided with a vertical handle 4 secured by any well known means such as screw 5 to the center of perforated bottom 15. Handle 4 is provided with a rounded or conical upper end to facilitate its entry into hole 8 of handle 6. A portion 20 of handle 4 is exposed when it is inserted into hole 8.

In operation the upper portion 13 of handle 6 is grasped between the thumb and fore finger to lift cover 2 from canister 1. A combination of solids and liquid may then be poured into solids container 3. The liquid will pass through the perforated bottom 15 leaving the solids in container 3. Cover 2 may then be replaced.

When it is desired to remove some of the substance from canister 1 handle 6 is grasped at the fluted portion 12 thus also grasping the exposed portion 20 of solids container handle 4 and thereby removing both the cover 2 and the solids container 3 as a unit from canister 1 without necessity of a locking or unlocking means. Thus it will be seen that the cover 2 and the solids container may be separately removed or they may be readily removed as a unit without danger of soiling or burning the fingers or the necessity of a special tool or forceps to remove solids container 3.

From the foregoing it will be apparent that the above-stated objects and advantages of the invention have been attained by the provision of a composite container with simple, convenient and novel cooperating handles permitting ready access to either part of the container without soiling or endangering the fingers. The device also permits a considerable saving of time in providing quick and ready access to either part of the container.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A container assembly comprising a main container having an upper open end, a second container removably supported by said upper end of said main container, an imperforate cover removably supported on said upper end of said main container in covering relation to said containers, a first handle on said cover, a second handle on said second container extending upwardly through said cover into the body portion of said first handle, said first handle and said cover being freely slidable on said second handle to permit independent removal of said cover, said second handle having gripping portions projecting beyond the sides of the body portion of said first handle whereby said first and second handles may be gripped simultaneously to remove said cover and said second container or said first handle may be gripped independently to remove only said cover.

2. A container assembly comprising a main container having an upper open end, a second container removably supported in said upper end of said main container, an imperforate cover removably supported on the upper end of said main container in covering relation to said containers, a first handle on said cover, a substantially cylindrical second handle on said second container extending upwardly through said imperforate cover into a cylindrical bore in said first handle, said second handle being freely slidable within said bore to permit independent removal of said cover, said first handle having horizontally extending flutes on its opposite sides intersecting said cylindrical bore to expose a portion of said second handle to permit it to be gripped with the same fingers which grip said first handle to permit simultaneous removal of said cover and said second container or released to remove only said cover.

3. A container assembly comprising a main cylindrical container member having an open upper end formed by a section of reduced diameter terminating at an inturned rim, a second container removably supported in the upper end of said main container and having an outwardly projecting rim cooperating with said inturned rim, a cover removably supported on the upper end of said main container and having a rim portion telescoped around said reduced diameter portion of said main container, a first hnadle on said cover, a substantially cylindrical second handle on said second container extending upwardly through said cover into a cylindrical bore formed in said first handle, said second handle being received for free sliding movement in said bore to permit independent removal of said cover, said first handle having horizontally extending flutes on its opposite sides intersecting said bore to expose a portion of said second handle to permit said second handle to be gripped simultaneously with said first handle to permit simultaneous removal of said cover and said second container.

References Cited in the file of this patent

UNITED STATES PATENTS

| | | |
|---|---|---|
| 2,734,790 | Pospie | Feb. 14, 1956 |
| 2,826,980 | Willman | Mar. 18, 1958 |